Patented Feb. 16, 1932

1,844,933

UNITED STATES PATENT OFFICE

MARY CYGANICK, OF DETROIT, MICHIGAN

COMPOSITION FOR CLEANING AND POLISHING GLASS

No Drawing.  Application filed July 19, 1928. Serial No. 294,064.

My invention relates to a new and useful improvement in a composition for cleaning and polishing glass and has for its object the provision of a composition which may be economically manufactured, which may be easily and quickly used, and which will be most efficient in cleaning and polishing functions.

The composition consists of bicarbonate of soda or commercial baking soda, in a dry state. To this ingredient there is added powdered blue clay also in a dry state, thoroughly mixed.

The bicarbonate of soda used with two pounds of powdered blue clay consists of one-half teaspoonful.

When these ingredients are mixed in these proportions they are moistened sufficiently to form a paste so that the product may be pressed into cakes or bricklike forms.

In use the composition is applied to the glass to be cleaned and polished by dissolving a portion of the composition in water or the composition may be applied directly to the surfaces to be polished and cleaned.

The use of the composition has proven most efficient and serves, in addition to cleaning the glass thoroughly, to lend to it a high and brilliant polish.

While I have illustrated and described the preferred composition, I do not wish to limit myself to the precise details and proportions set out, but desire to avail myself of such variations and modifications as come within the scope of the appended claim.

Having thus described my invention what I claim as new and desire to secure by Letters Patent is:

A composition for cleaning and polishing glass consisting of powdered blue clay two pounds and bicarbonate of soda, one-half teaspoonful.

In testimony whereof I have signed the foregoing specification.

MARY CYGANICK.